United States Patent
Sakai et al.

(10) Patent No.: US 7,448,677 B2
(45) Date of Patent: Nov. 11, 2008

(54) HEADREST CONTROL APPARATUS FOR VEHICLE AND METHOD OF CONTROLLING HEADREST CONTROL APPARATUS FOR VEHICLE

(75) Inventors: Morio Sakai, Toyota (JP); Masaki Mori, Kariya (JP); Motomi Iyoda, Seto (JP); Tatsuhiro Ookawa, Toyota (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 0 days.

(21) Appl. No.: 11/657,666

(22) Filed: Jan. 25, 2007

(65) Prior Publication Data
US 2007/0176473 A1 Aug. 2, 2007

(30) Foreign Application Priority Data
Jan. 30, 2006 (JP) ............................. 2006-021447

(51) Int. Cl.
*B60N 2/427* (2006.01)
*B60R 21/013* (2006.01)

(52) U.S. Cl. ................................. 297/216.12
(58) Field of Classification Search ............. 297/216.12
See application file for complete search history.

(56) References Cited

U.S. PATENT DOCUMENTS

| | | | |
|---|---|---|---|
| 5,694,320 A | 12/1997 | Breed | |
| 6,082,817 A * | 7/2000 | Muller | 297/216.12 |
| 6,213,548 B1 * | 4/2001 | Van Wynsberghe et al. | 297/216.12 |
| 6,402,195 B1 | 6/2002 | Eisenmann et al. | |
| 6,550,856 B1 * | 4/2003 | Ganser et al. | 297/216.12 X |
| 6,623,073 B2 * | 9/2003 | Schafer et al. | 297/216.12 |
| 6,688,697 B2 * | 2/2004 | Baumann et al. | 297/216.12 X |
| 6,715,829 B2 * | 4/2004 | Svantesson et al. | 297/216.12 |
| 6,746,078 B2 | 6/2004 | Breed | |
| 6,863,343 B2 * | 3/2005 | Pal et al. | 297/216.12 |
| 6,890,028 B2 * | 5/2005 | Pal et al. | 297/216.12 |
| 7,048,334 B2 * | 5/2006 | Pal et al. | 297/216.12 |
| 7,070,205 B2 * | 7/2006 | Becker et al. | 297/216.12 X |
| 7,070,235 B2 * | 7/2006 | Schilling et al. | 297/216.12 |

(Continued)

FOREIGN PATENT DOCUMENTS

JP 07-067744 A 3/1995

(Continued)

*Primary Examiner*—Rodney B. White
(74) *Attorney, Agent, or Firm*—Buchanan Ingersoll & Rooney PC

(57) ABSTRACT

A headrest control apparatus for a vehicle includes: a headrest rear portion; a headrest front portion movable relative to the headrest rear portion between a first position and a second position; driving means for moving the headrest front portion relative to the headrest rear portion and controlling means controlling the driving means to move the headrest front portion towards the second position when a proximity of an object from a rear of the vehicle is detected and stop a movement of the headrest front portion towards the second position when the head detecting circuit detects the one of a proximity of the head towards, and a contact of the head with, the headrest front portion. The controlling means operates the head detecting circuit when the headrest front portion moves towards the second position.

20 Claims, 4 Drawing Sheets

U.S. PATENT DOCUMENTS

| | | | |
|---|---|---|---|
| 7,073,856 B2 * | 7/2006 | Akaike et al. | 297/216.12 |
| 7,108,320 B2 * | 9/2006 | Schafer et al. | 297/216.12 |
| 7,111,901 B2 * | 9/2006 | Schlierf et al. | 297/216.12 |
| 7,195,313 B2 * | 3/2007 | Hippel et al. | 297/216.12 |
| 2001/0040396 A1 * | 11/2001 | Kreuels et al. | 297/216.12 |
| 2003/0227199 A1 | 12/2003 | Yoshizawa et al. | |
| 2004/0195894 A1 * | 10/2004 | Pal et al. | 297/406 |
| 2005/0077762 A1 * | 4/2005 | Kraemer et al. | 297/216.12 |
| 2007/0052265 A1 * | 3/2007 | Sakai et al. | 297/216.12 |

FOREIGN PATENT DOCUMENTS

| | | |
|---|---|---|
| JP | 08-187139 A | 7/1996 |
| JP | 2000-309242 A | 11/2000 |
| JP | 2001-178136 A | 6/2001 |
| JP | 2002-014174 A | 1/2002 |
| JP | 2003-54343 A | 2/2003 |
| JP | 2004-009891 A | 1/2004 |
| JP | 2005-087650 A | 4/2005 |

* cited by examiner

HEADREST CONTROL APPARATUS FOR VEHICLE AND METHOD OF CONTROLLING HEADREST CONTROL APPARATUS FOR VEHICLE

CROSS REFERENCE TO RELATED APPLICATIONS

This application is based on and claims priority under 35 U.S.C. § 119 to Japanese Patent Application 2006-021447, filed on Jan. 30, 2006, the entire content of which is incorporated herein by reference.

FIELD OF THE INVENTION

The present invention relates to a headrest control apparatus mounted on a seat for a vehicle such as an automobile and a method of controlling the same.

BACKGROUND

In case of a vehicle rear impact in a situation where an upper half of the body of an occupant has not been supported by a seatback, a sudden movement of the upper body to the seatback triggers a head of the occupant to be unexpectedly moved to a headrest. Here, a difference is created between a movement amount of the upper body and the one of the head. More specifically, the head of the occupant is moved to in a rearward direction of a vehicle farther than the upper body. Subsequently, the upper body is swung widely toward the front in response to a reaction of the impact force. Here, the neck of the occupant bears a load due to the difference in the movement amount.

In the light of the foregoing, conventionally, headrest control apparatuses have been suggested, each of which is provided with a mechanism for moving a headrest to a position of a head of an occupant in case of a vehicle rear impact. According to this structure, a head of an occupant is restrained from widely moving rearward in case of a rear impact and is protected, thereby reducing a load subjected to the neck of an occupant.

In order to stop appropriately a headrest at a position of a head of an occupant with the aforementioned structure of the apparatus, it is possible to provide a proximity sensor, such as a capacitive sensor, at the headrest and to detect an approaching of the head towards the headrest. A structure of a capacitive detecting circuit, which detects a detected object, is disclosed for example in JP2002-014174A, in which the approaching of the head is detected based upon oscillation of an oscillating circuit, which oscillates in response to changes in voltage due to electric charging and discharging to a sensor electrode for example. Further, such structure of a capacitive detecting circuit is further disclosed for example in JP2001-178136A, in which capacitance of a sensor electrode is compared with reference capacitance of a control circuit and an approaching of the head is detected based upon the comparison result.

In such headrest control apparatus, in order to detect a head of an occupant while moving the headrest forward, such conventional capacitive detecting circuit electrically charges and discharges the sensor electrode by a switching operation of a clock signal with a high frequency. Therefore, switching noise of a clock signal is created and noise may be released from a radio mounted on a vehicle. That is, there is a possibility that this sensor electrode serves as an antenna and radio noise is released. Further, where a sensor, which is different from a capacitive sensor, is employed as a proximity sensor, when an ultrasonic sensor is employed for example, an occupant may recognize supersonic waves, which are emitted from the ultrasonic sensor, as noise. Further, there is a case that a headrest is equipped with a contact sensor to detect a contact of a head against the headrest. In such case, it is possible to employ a piezoelectric sensor as a contact sensor. A piezoelectric element of the piezoelectric sensor is applied with alternating voltage with a predetermined frequency and is oscillated with a predetermined frequency. Once a head of an occupant makes a contact with the headrest, the piezoelectric sensor detects reduction in amplitude of the frequency and confirms the contact of the head against the headrest. However, in such circumstances, because alternating voltage with a predetermined frequency is applied to the piezoelectric element, noise may be generated based upon this alternating voltage.

The present invention has been made in view of the above circumstances, and provides a headrest control apparatus for a vehicle, which apparatus detects a proximity of a head towards a headrest by use of a proximity sensor, a contact sensor, or the like and restrains an occurrence of noise such as radio noise, and a method of controlling the headrest control apparatus.

SUMMARY OF THE INVENTION

According to an aspect of the present invention, a headrest control apparatus for a vehicle includes: a headrest rear portion supported by a seatback; a headrest front portion movable relative to the headrest rear portion between a first position, at which the headrest front portion is in contact with the headrest rear portion, and a second position, at which the headrest front portion is distant from the headrest rear portion; driving means for moving the headrest front portion relative to the headrest rear portion between the first position and the second position; a head detecting sensor provided at the headrest front portion and outputting a predetermined detection signal when a head of an occupant is proximate to the headrest front portion or when a head of an occupant is in contact with the headrest front portion; a head detecting circuit detecting one of a proximity of the head towards, and a contact of the head with, the headrest front portion based upon the detection signal of the head detecting sensor; and controlling means controlling the driving means to move the headrest front portion towards the second position when a proximity of an object from a rear of the vehicle is detected and to stop a movement of the headrest front portion towards the second position when the head detecting circuit detects the one of a proximity of the head towards, and a contact of the head with, the headrest front portion. The controlling means operates the head detecting circuit only when the headrest front portion moves towards the second position. Here, the wording of "proximity" includes at least one of "approaching", "near" and "contact".

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
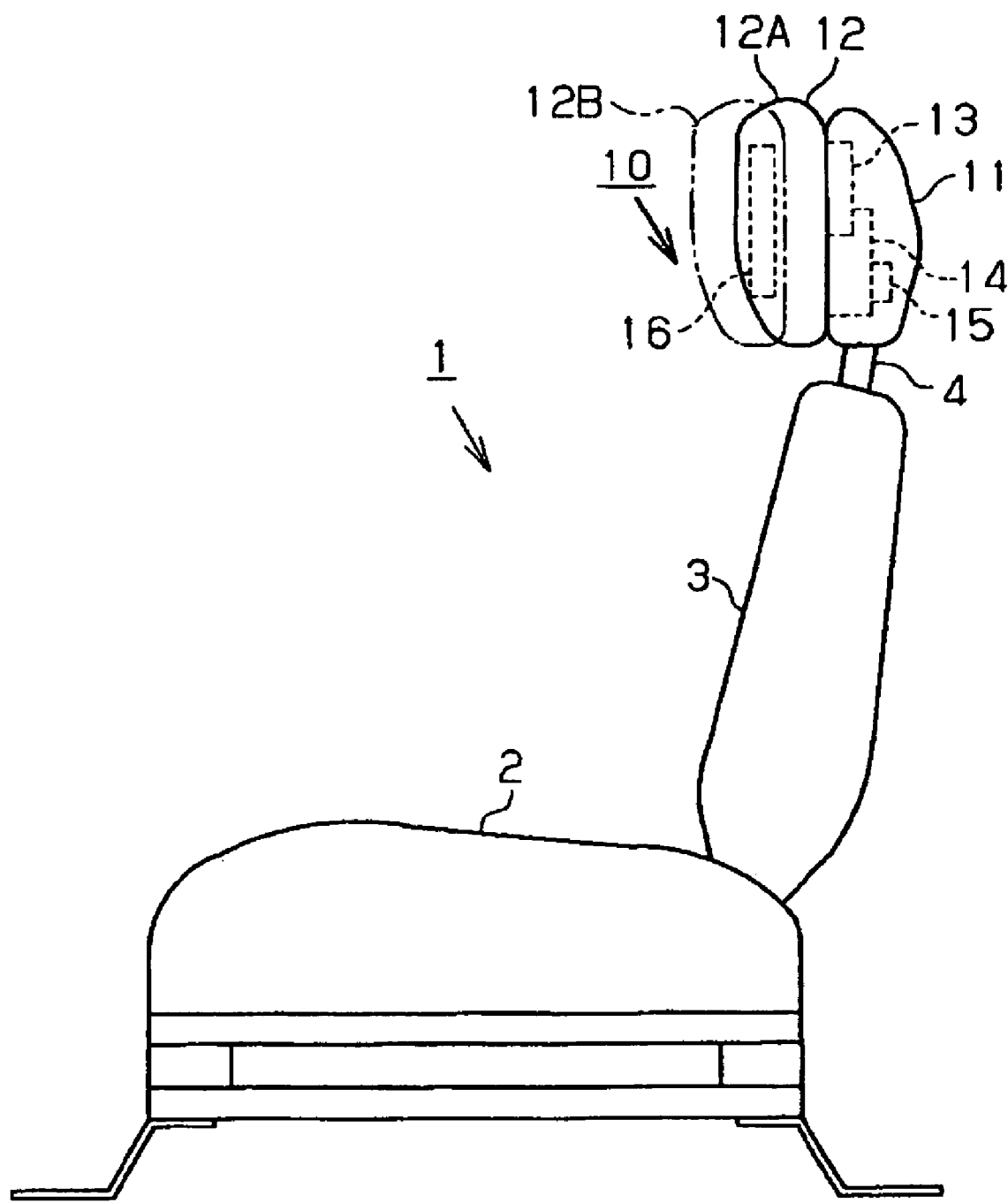
FIG. 1 is a side view illustrating a seat for a vehicle to explain a headrest control apparatus according to an embodiment of the present invention.
Figure 2:
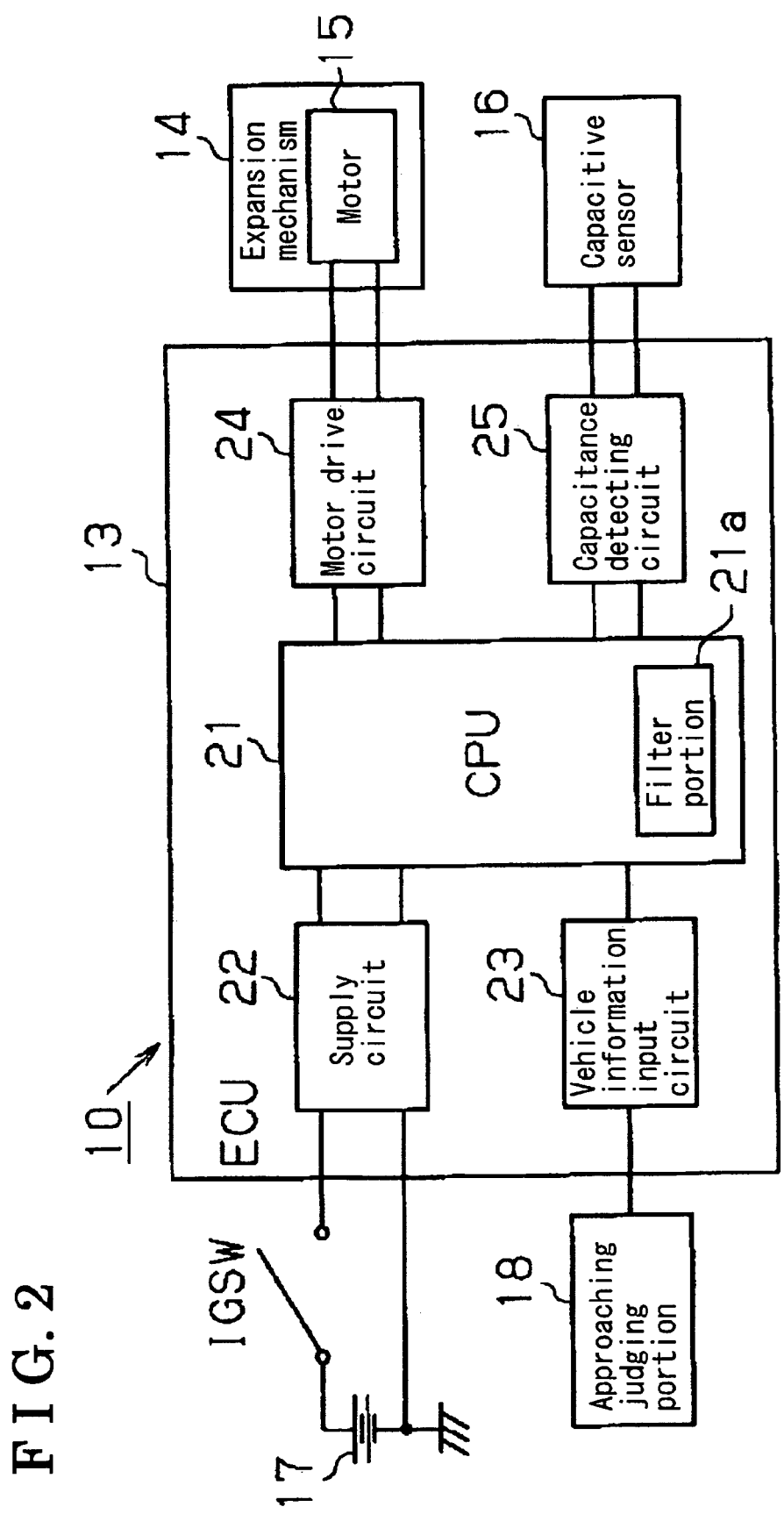
FIG. 2 is a block view illustrating an electrical configuration of the headrest control apparatus.

An embodiment of the present invention will be described herein with reference to the attached drawings. FIGS. 1 and 2 schematically illustrate a headrest control apparatus 10 for a vehicle according to an embodiment of the present invention. Several components of the headrest control apparatus 10 are mounted on a seat 1 for the vehicle. FIG. 1 illustrates a side view of the seat 1, which is used for a passenger of the vehicle such as an automobile. However, this seat 1 can be used for a driver of a vehicle as well. As illustrated in FIG. 1, the seat 1 includes a seat cushion 2 and a seatback 3 supported to be tilted relative to the seat cushion 2. The headrest control apparatus 10 is mainly configured with a headrest front portion 12 and a headrest rear portion 11, which both are supported by the seatback 3.

As illustrated in FIG. 1, the headrest rear portion 11 is supported by a headrest stay 4 fixedly attached to an upper portion of the seatback 3, and the headrest front portion 12 is movable back and forth relative to the headrest rear portion 11. More particularly, as depicted by a solid line in FIG. 1, the headrest front portion 12 is movable back and forth between a fully retracted position 12A (first position), in which the headrest front portion 12 is close to or in contact with the headrest rear portion 11, and a fully deployed position 12B (second position), in which the headrest front portion 12 is at its most distant point from the headrest rear portion 11. The fully retracted portion 12A is depicted by a solid line in FIG. 1, while the fully deployed position 12b is depicted by a chain double-dashed line therein. While a vehicle is driving at a normal condition, the headrest front portion 12 is stowed at the fully retracted position 12A.

The headrest control apparatus 10 further includes an electronic control unit 13 (hereinafter, referred to as ECU 13), an expansion mechanism 14, a motor 15 as driving means and a capacitive sensor 16 as a head detecting sensor. The expansion mechanism 14 is activated by the motor 15 and expands or retracts between the headrest rear portion 11 and the headrest front portion 12. The headrest front portion 12 is hence moved back and forth relative to the headrest rear portion 11.

The capacitive sensor 16 is attached to a front surface of the headrest front portion 12. The capacitive sensor 16 detects changes in capacitance in a space. The capacitance in the space is changed when a head of an occupant seated on the seat 1 interferes therein. The capacitive sensor 16 then produces and outputs a detection signal representing the changes in capacitance in the space or a detection signal representing capacitance at each moment. When the ECU 13 detects proximity of a rear vehicle (object) of the vehicle (automobile), the ECU 13 controls the motor 15 to shift the headrest front portion 12 from the fully retracted position 12A towards the fully deployed position 12B. Subsequently, the ECU 13 controls the motor 15 to retract the headrest front portion 12 to the fully retracted position 12A. Hereinafter, the wording of "proximity" of a rear vehicle defines at least two situations: one is that a rear vehicle is approaching the vehicle; and the other one is that a rear vehicle is set close to the vehicle.

Further, the ECU 13 confirms, on the basis of a detection signal of the capacitive sensor 16, a proximity of the head towards, or a contact of the head with, the capacitive sensor 16, i.e., the headrest front portion 12. When the changes in capacitance, or capacitance, detected by the capacitive sensor 16 is within a predetermined amount, the ECU 13 confirms or detects that the head is close to or approaching the headrest front portion 12 within predetermined space. When the ECU 13 detects the head based upon a detection signal of the capacitive sensor 16 while the headrest front portion 12 is being moved towards the fully deployed position 12B, the ECU 13 stops the movement of the headrest front portion 12. On the other hand, when the ECU 13 does not detect the head, the ECU 13 moves the headrest front portion 12 back to the fully deployed position 12B. Hereinafter, the wording of "proximity" of the head defines at least three situations: one is that a head is approaching the headrest front portion 12; another one is that a head is set close to the headrest front portion 12 within predetermined space; and the last one is that a head is in contact with the headrest front portion 12.

Described below is an electrical configuration of the headrest control apparatus 10. As illustrated in FIG. 2, the headrest control apparatus 10 includes the ECU 13, the motor 15 connected to the ECU 13, the capacitive sensor 16, an electric power unit 17 and a proximity judging portion 18 as object detecting means.

The ECU 13 further includes a CPU 21 as controlling means, a supply circuit 22 connected to the CPU 21, a vehicle information input circuit 23, a motor drive circuit 24 and a capacitance detecting circuit 25 as a head detecting circuit.

The CPU 21 is connected to the electric power unit 17 via an ignition switch (IGSW). In response to an ON operation of the ignition switch, the CPU 21 is supplied with electric current from the electric power unit 17 via the supply circuit 22. The headrest control apparatus 10 is turned on at every ON operation of the ignition switch.

The CPU 21 is further connected to the proximity judging portion 18 via the vehicle information input circuit 23 and is inputted with information on the vehicle from the proximity judging portion 18, such as an object approaching from the rear. The proximity judging portion 18 is connected to radar (not illustrated) firmly attached to a bumper of a vehicle rear end and is inputted with a signal of radar. The proximity judging portion 18 then overall determines a relative speed and/or distance of the vehicle against a rear object (vehicle) and a driving speed of the vehicle and judges whether the rear vehicle is approaching (or is positioned around). The judgment result is outputted to the vehicle information input circuit 23.

The CPU 21 is further connected to the motor 15 via the motor drive circuit 24 controlling the driving of the motor 15. The CPU 21 is further connected to the capacitive sensor 16 via the capacitance detecting circuit 25. The capacitance detecting circuit 25 judges, on the basis of a signal of the capacitive sensor 16, whether the head is positioned around (, is approaching within predetermined space, or is in contact with) the capacitive sensor 16. The judgment result is inputted into the CPU 21.

More specifically, the capacitance detecting circuit 25 includes a reference capacitor (not illustrated) that can store electric charge and electrically charges the capacitive sensor 16 by use of the electric charge. The voltage of the capacitive sensor 16 varies for example depending on a distance relative to the head of the occupant. Accordingly, the capacitance detecting circuit 25 detects proximity of the head of the occupant based upon a detected voltage of the capacitive sensor 16. Further, the capacitance detecting circuit 25 electrically charges and discharges the reference capacitor and the capacitive sensor 16 by turning on and off a switch (not illustrated) with a high-frequency clock signal.

When the CPU 21 detects, based upon a detection signal inputted from the vehicle information input circuit 23, the proximity of a rear vehicle, the CPU 21 controls the motor drive circuit 24 and moves the headrest front portion 12 from the fully retracted position 12A towards the fully deployed position 12B.

The CPU 21 may detect, based upon a detection signal inputted from the capacitance detecting circuit 25, the proximity of the head to the headrest front portion 12 while the CPU 21 is operating the headrest front portion 12. In such circumstances, the CPU 21 controls the motor drive circuit 24 to stop the forward movement of the headrest front portion 12. On the other hand, when the CPU 21 does not detect the proximity of the head to the headrest front portion 12 during the forward movement of the headrest front portion 12, the CPU 21 moves the headrest front portion 12 towards the fully deployed position 12B. Subsequently, the CPU 21 protects the head of the occupant at a position, where the headrest front portion 12 is close to or in contact with the head, or at the fully deployed position 12B, for approximately two seconds. The CPU 21 then controls the motor drive circuit 24 to move the headrest front portion 12 back to the fully retracted position 12A.

According to the embodiment of the present invention, the CPU 21 activates the capacitance detecting circuit 25 only when the CPU 21 operates the headrest front portion 12 from the fully retracted position 12A towards the fully deployed position 12B. More particularly, the CPU 21 operates the capacitance detecting circuit 25 when the CPU 21 is inputted with information on a rear approaching vehicle on the basis of a detection signal of the vehicle information input circuit 23.

When the movement of headrest front portion 12 stops, the CPU 21 discontinues operating the capacitance detecting circuit 25. More particularly, the CPU 21 stops operating the capacitance detecting circuit 25 when the CPU 21 confirms or detects the proximity of the head relative to the headrest front portion 12 on the basis of a detection signal of the capacitance detecting circuit 25 while the headrest front portion 12 is moving towards the fully deployed position 12B. Further, the CPU 21 stops the operation of the capacitance detecting circuit 25 in a predetermined period of time since the initial movement of the headrest front portion 12 towards the fully deployed position 12B, if the CPU 21 can not confirm or detect the proximity of the head relative to the headrest front portion 12. Alternatively, the CPU 21 can stop the operation of the capacitance detecting circuit 25 in a predetermined period of time since the initial movement of the headrest front portion 12 towards the fully deployed position 12B without depending on the detection signal of the capacitance detecting circuit 25.

According to the embodiment of the present invention, the CPU 21 further includes a filter portion 21a that is inputted with a detection signal of the capacitance detecting circuit 25. The filter portion 21a is configured with a plurality of lowpass filters of which cutoff frequencies are different. The filter portion 21a attenuates or reduces frequencies higher than the cutoff frequencies so that the CPU 21 can confirm the position or movement of the head based upon a signal representing the result of the filter portion 21a. This contributes to enhancing detecting precision of the filter portion 21a. Further, in the filter portion 21a, a lowpass filter to be employed is shifted from the one having a high cutoff frequency to a next one having a low cutoff frequency consecutively in response to an elapsed time since the start-up of the capacitance detecting circuit 25. The CPU 21 confirms the proximity of the head based upon the result of the filter portion 21a with the aforementioned configuration.

Electric charging and discharging to the capacitive sensor 16 is achieved by turning on and off a switch (not illustrated) with a high-frequency clock signal. Here, there is a possibility of an occurrence of radio noise due to this clock signal. In the light of the foregoing, in order to prevent such radio noise from interfering the surroundings, the capacitance detecting circuit 25 can be housed in a shielding case. However, it is not preferable that the capacitive sensor 16, which is employed for the purpose of detecting the approaching or position of the head of the occupant, is housed in the shielding case. Meanwhile, unless the capacitive sensor 16 is housed in the shielding case, the capacitive sensor 16 may act as an antenna and release radio noise to the surroundings.

In this respect, according to the embodiment of the present invention, the CPU 21 activates the capacitance detecting circuit 25 only in the event where the headrest front portion 12 moves. The CPU 21 stops the capacitance detecting circuit 25 at a time of another normal driving condition of the vehicle, i.e., while the vehicle is driving at a driving condition without an approaching of a vehicle from the rear. Therefore, it is possible to prevent radio noise from being created during a normal driving condition of the vehicle where an occurrence of radio noise is considered to be an unpleasantness to an occupant.

Further, the capacitance detecting circuit 25 is started up in situations where a vehicle is approaching from the rear and the headrest front portion 12 is moved. In this case, although radio noise is generated in response to the start-up of the capacitance detecting circuit 25, the period of time, in which the capacitance detecting circuit 25 is operated, is relatively short so that radio noise does not turn to be a factor of an unpleasantness to an occupant. Further, the operation of the capacitance detecting circuit 25 is implemented only if circumstances require the need to ensure an occupant's security so that it does not lead to an increase in an unpleasantness to the occupant.

Figure 3:
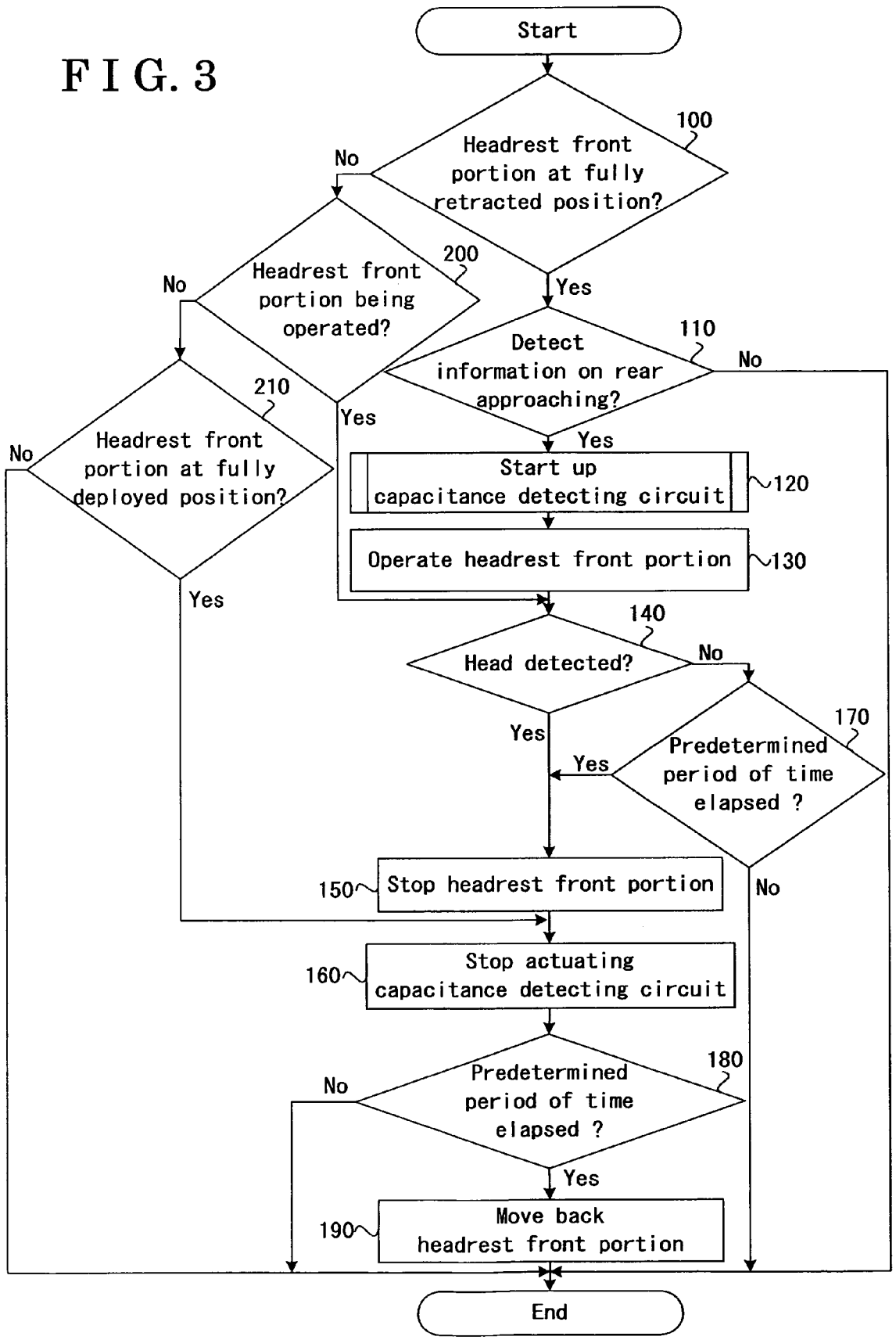
FIG. 3 is a flowchart for explaining a process implemented by an ECU.

Described below is a process implemented by the ECU 13 of the headrest control apparatus 10. As illustrated in FIG. 3, in step 100, the CPU 21 of the ECU 13 first judges whether the headrest front portion 12 has been stowed at the fully retracted position 12A. When an affirmative answer YES is obtained in step 100, i.e., when the headrest front portion 12 is determined to be at the fully retracted position 12A, the process proceeds to step 110. In step 110, the CPU 21 judges the presence or absence of an object approaching from the rear. When an affirmative answer YES is obtained in step 110, i.e., when the CPU 21 determines the presence of an object approaching from the rear, the program proceeds to step 120. In step 120, the CPU 21 starts up the capacitance detecting circuit 25. Step 120 configures a circuit operation step. Details of the control in step 120 is described later. When a negative answer NO is obtained in step 110, i.e., when the CPU 21 determines the absence of an object approaching from the rear, the CPU 21 terminates this process.

The program then proceeds from step 120 to step 130, wherein the CPU 21 initiates a motor driving of the headrest front portion 12 toward the fully deployed position 12B. Step 130 configures a headrest movement step according to the embodiment of the present invention. In step 140, the CPU 21 judges whether proximity of a head of an occupant is detected. When an affirmative answer YES is obtained in step 140, i.e., when proximity of the head is detected in step 140, the program proceeds to step 150. In step 150, the CPU 21 stops the forward movement of the headrest front portion 12. In step 160, the CPU 21 stops the operation of the capacitance detecting circuit 25. Step 150 configures a headrest stop step and step 160 configures a circuit stop step.

When a negative answer NO is obtained in step 140, i.e., when the CPU 21 determines the absence of the head of the occupant in step 140, the program proceeds to step 170. In step 170, the CPU 21 judges whether a predetermined period of time (e.g., approximately one second) has elapsed since the start-up of the movement of the headrest front portion 12. When an affirmative answer YES is obtained in step 170, i.e., when the predetermined period of time has elapsed, the program proceeds to steps 150 and 160. On the other hand, when a negative answer NO is obtained in step 170, i.e., when the predetermined period of time has not elapsed, the process in FIG. 3 is terminated.

In step 180, the CPU 21 judges whether a predetermined period of time (e.g., approximately two seconds) has elapsed since the stop of the movement of the headrest front portion 12 in step 150. When an affirmative answer YES is obtained in step 180, i.e., when the predetermined period of time has elapsed in step 180, the program proceeds to step 190, wherein the headrest front portion 12 is moved back to the rear and returns to the fully retracted position 12A. On the other hand, when a negative answer NO is obtained in step 180, i.e., when the predetermined period of time has not elapsed in step 180, the CPU 21 terminates the process.

Going back to step 100, when a negative answer NO is obtained in step 100, i.e., when the headrest front portion 12 is determined not to be at the fully retracted position 12A, the program proceeds to step 200. In step 200, the CPU 21 judges whether the headrest front portion 12 is in operation. When the CPU 21 determines that the headrest front portion 12 is in operation in step 200, the program proceeds to step 140. On the other hand, when the CPU 21 determines that the headrest front portion 12 is not in operation in step 200, the program proceeds to step 210. In step 210, the CPU 21 judges whether the headrest front portion 12 is stationary at the fully deployed position 12B. When an affirmative answer YES is obtained in step 210, i.e., when the headrest front portion 12 is stationary at the fully deployed position 12b, the program proceeds to step 180. On the other hand, when a negative answer NO is obtained in step 210, i.e., when the headrest front portion 12 is not stationary at the fully deployed position 12B, the CPU 21 terminates the process.

Figure 4:
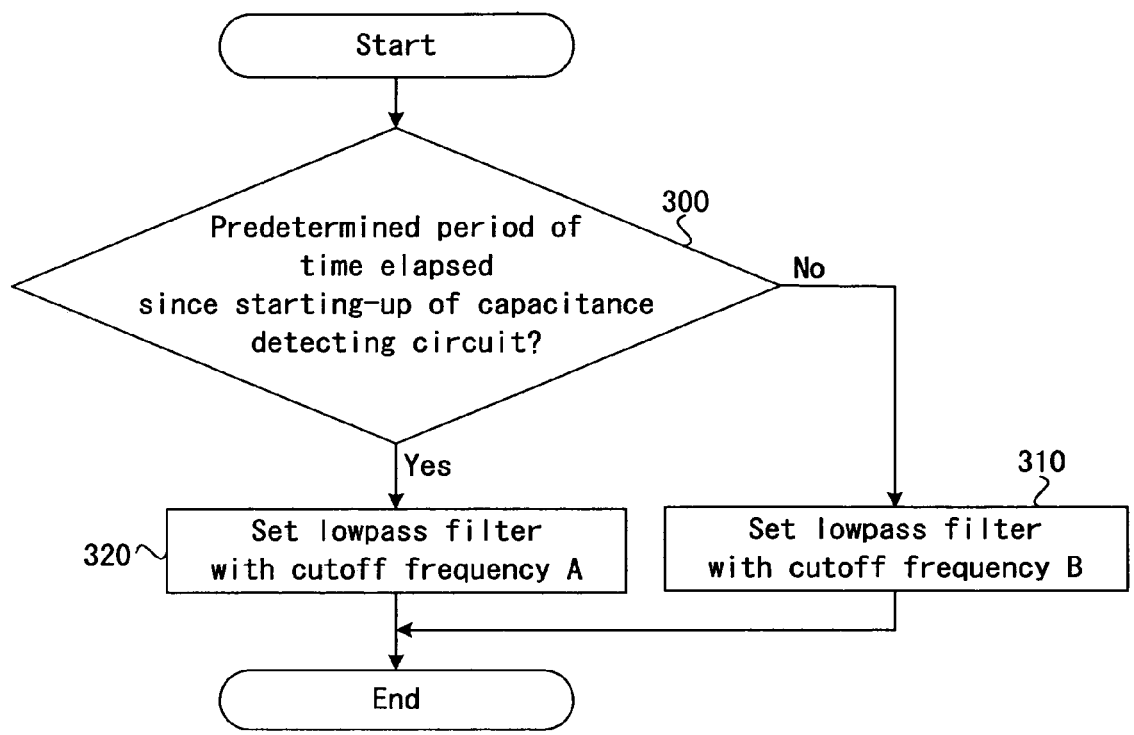
FIG. 4 is a flowchart for explaining a switching operation of filters.

Described below is an operation process of the capacitance detecting circuit 25 in step 120. As illustrated in FIG. 4, in step 300, the CPU 21 first judges whether a predetermined period of time has elapsed since an operation of the headrest front portion 12 has been initiated, i.e., since the starting-up of the operation of the capacitance detecting circuit 25. When a negative answer NO is obtained in step 300, i.e., when the predetermined period of time has not elapsed, the program proceeds to step 310. In step 310, a lowpass filter, of which cutoff frequency is B, is set and the process is terminated.

When an affirmative answer YES is obtained in step 300, i.e., when the predetermined period of time has elapsed, the program proceeds to step 320. In step 320, a lowpass filter, of which cutoff frequency is A, is set and the process is terminated. Here, the cutoff frequency A is smaller than the cutoff frequency B. The predetermined period of time in step 300 is determined in response to a time required for a low cutoff-frequency lowpass filter to exert a desired performance since starting up the operation of the capacitance detecting circuit 25.

That is, in detecting a head by the capacitive sensor 16, a lowpass filter with a low cutoff frequency is needed to avoid error detection. According to the embodiment of the present invention, the capacitance detecting circuit 25 is operated only when needed. This may generate a delay in an initial rising of the lowpass filter with a low cutoff frequency in the event that the operation of the capacitance detecting circuit 25 is started up. Meanwhile, a lowpass filter with a high cutoff frequency (small filtering performance) excels in an electric following in the event that the operation of the capacitance detecting circuit 25 is started up. By use of this characteristics of filters, it is preferable that a lowpass filter with a high cutoff frequency is employed when the operation of the capacitance detecting circuit 25 is started up, thereby shortening a rising time of the lowpass filter, and thereafter a lowpass filter with a low cutoff frequency is employed, thereby ensuring a performance of the filter at a desired level.

While the ignition switch of a vehicle has been at an ON state, the ECU 13 repeats steps 100 to 210 and steps 310 to 330 as described above. According to the embodiment of the present invention, the following effects can be obtained.

(1) In the headrest control apparatus 10, the capacitance detecting circuit 25 is activated only when the headrest front portion 12 moves towards the fully deployed position 12B. Therefore, radio noise, which is generated in response to an activation of the capacitance detecting circuit 25, is prevented from being generated while a vehicle is driving at a normal condition without detecting a vehicle or object approaching from the rear. When the headrest front portion 12 moves, the capacitance detecting circuit 25 is operated so that radio noise is generated. However, the capacitance detecting circuit 25 is operated only for a short period of time so that it does not increase an unpleasantness to an occupant. As described above, limiting the period of time, in which radio noise is generated, enables to prevent an occurrence of noise released from a radio in a vehicle. Further, sensor electrodes of the capacitive sensor 16 serving as the head detecting sensor are usually mounted not being covered by a shield or others inside the headrest front portion 12. This has been considered to be a considerable matter for a capacitive sensor that a shield cannot be employed as a means for preventing an occurrence of a radio noise. However, according to the embodiment of the present invention, because the capacitive sensor 16 is housed in the headrest front portion 12 without being covered by a shield, changes in capacitance associated with the head can be detected precisely. In other words, such considerable matter is solved by the embodiment of the present invention. Accordingly, according to the embodiment of the present invention, it is possible to reduce an unpleasantness to an occupant, which may occur due to radio noise, as well as not to deteriorate a detection precision. Further, because a shield is not needed, it is possible to restrain an increase in a manufacturing cost.

(2) In the headrest control apparatus 10, the capacitance detecting circuit 25 is activated at a time of detecting a possible collision or impact of a vehicle, so that the capacitance detecting circuit 25 is operated appropriately in response to or as an initial movement of the headrest front portion 12. Therefore, when a vehicle is driving at a normal condition without detecting an object or a vehicle approaching from the rear, it is possible to prevent radio noise from being created, which radio noise is created in response to an operation of the capacitance detecting circuit 25.

(3) In the headrest control apparatus 10, the capacitance detecting circuit 25 is stopped when a head of an occupant is detected to be a around or to be in contact with the headrest front portion. Therefore, the capacitance detecting circuit 25 can be stopped appropriately in response to or as a stop of a movement of the headrest front portion 12. As described above, in the event of an impact or collision of the vehicle, the capacitance detecting circuit 25 is stopped. Therefore, the headrest front portion 12 can protect the head of an occupant and an occurrence of radio noise due to an operation of the capacitance detecting circuit 25 can be prevented.

(4) In the headrest control apparatus 10, once the headrest front portion 12 reaches the fully deployed position 12B, the capacitance detecting circuit 25 is stopped. In other words, the capacitance detecting circuit 25 is stopped appropriately in response to or as a stop of a movement of the headrest front portion 12. As described above, after protecting a head of an occupant by the headrest front portion 12 in the event of an impact or collision of the vehicle, it is possible to avoid, by stopping the capacitance detecting circuit 25, an occurrence of radio noise due to an operation of the capacitance detecting circuit 25.

(5) In the headrest control apparatus 10, until the predetermined period of time elapses since an initial operation of the capacitance detecting circuit 25, a first lowpass filter with a high cutoff frequency is employed. Once the predetermined period of time elapses, the first lowpass filter is substituted by a second lowpass filter with a cutoff frequency lower than the cutoff frequency of the first lowpass filter. According to the embodiment of the present invention, because the capacitance detecting circuit 25 is activated only when used, there is a possibility of a delay in an initial rising of the lowpass filter. However, as described above, the first lowpass filter is employed immediately after the start-up of the operation of the capacitance detecting circuit 25 so as to enhance an electric following, and the second lowpass filter, which possesses an ability sufficient for a normal operation, is employed when an output of the capacitance detecting circuit 25 is stabilized so that an appropriate performance can be maintained.

The present invention is not limited to the above embodiment and can be applied to the following modified examples. According to the embodiment, the CPU 21 starts up the operation of the capacitance detecting circuit 25 based upon a detection signal of the proximity judging portion 18. Alternatively, the CPU 21 can start up the operation of the capacitance detecting circuit 25 in another way. For example, the CPU 21 can start up the operation of the capacitance detecting circuit 25 after starting the control of the motor drive circuit 24. More specifically, the operation of the capacitance detecting circuit 25 can start up when a control signal is transmitted from the motor drive circuit 24 to the motor 15 of the expansion mechanism 14 and the motor 15 is driven, i.e., when the CPU 21 detects that the motor 15 is driven. In this case, the order of steps 120 (circuit operation step) and step 130 (headrest movement step) is switched. Still alternatively, the operation of the capacitance detecting circuit 25 can start up when the headrest front portion 12 is operated by the motor 15 and the CPU 21 detects the operation of the headrest front portion 12. Still alternatively, the capacitance detecting circuit 25 can start up simultaneously as the initial activation of the motor drive circuit 24. In this case, step 120 (circuit operation step) and step 130 (headrest movement step) are implemented in parallel.

According to the embodiment, the CPU 21 stops the operation of the capacitance detecting circuit 25 when the CPU 21 confirms the proximity of a head of an occupant on the basis of a detection signal of the capacitance detecting circuit 25 or when the headrest front portion 12 reaches the fully deployed position 12B. Alternatively, the CPU 21 can stop the operation of the capacitance detecting circuit 25 in another way. For example, the CPU 21 can stop the operation of the capacitance detecting circuit 25 simultaneously as stopping the control of the motor drive circuit 24. In this case, step 150 (headrest stop step) and step 160 (circuit stop step) are implemented in parallel. Still alternatively, a position sensor can be mounted to detect a movement of the headrest front portion 12 to the fully deployed position 12B. In this case, the CPU 21 can stop the operation of the capacitance detecting circuit 25 on the basis of a detection signal of the position sensor.

According to the embodiment, the head detecting sensor is exemplified by the capacitive sensor 16 that is a proximity sensor. Alternatively, an ultrasonic sensor that is a proximity sensor can substitute this capacitive sensor 16. In this case, the ultrasonic sensor can be operated only when the headrest front portion 12 moves so that it is possible to reduce an unpleasantness to an occupant. Still alternatively, the head detecting sensor can be not such proximity sensor but a contact sensor such as a piezoelectric sensor. In this case, a piezoelectric element of such piezoelectric sensor is applied with alternating voltage with a predetermined frequency and detect a contact of a head only when the headrest front portion 12 is moved. Therefore, it is possible to limit or reduce a time in which noise is caused due to alternating voltage applied to the piezoelectric element.

According to the embodiment, the CPU 21 switches a lowpass filter to be employed at the filter portion 21a depending upon a passed time since an activation of the capacitance detecting circuit 25. However, such switching of lowpass filters does not have to be necessarily done.

According to the embodiment, the seat 1 having the headrest control apparatus 10 is applied for a passenger. However, the seat 1 can be applied as another seat in a vehicle such as a driver's seat, a back seat and so on.

As described above, a capacitance detecting circuit is activated only when the headrest front portion is moved towards a fully deployed position. Therefore, it is possible to prevent radio noise due to the activation of the capacitance detecting circuit from being generated in a situation where a vehicle is driving at a normal condition without detecting proximity of an object or a vehicle from the rear. Therefore, in the case of a vehicle driving at a normal condition without detecting a rear approaching or proximity of an object, it is possible to prevent radio noise, which may be generated due to the activation of the capacitance detecting circuit, from being generated. Further, the capacitance detecting circuit is activated when the headrest front portion moves. In such circumstances, although radio noise is generated, there is a possibility that any other impact noise at a vehicle may be generated, which is louder than radio noise. Further, the period of time, in which the capacitance detecting circuit is in operation, is short. Therefore, radio noise does not turn to be a factor to increase unpleasantness to an occupant. As described above, by limiting the period of time, in which radio noise is generated, it is possible to prevent noise from being generated from radio while a vehicle is being used.

The controlling means operates the head detecting circuit when the controlling means detects an impact possibility of the vehicle with the object based upon the detection signal of the object detecting means.

In this case, because the capacitance detecting circuit is detected when an impact possibility of the vehicle is detected, the capacitance detecting circuit is activated appropriately in response to or as starting of movement of the headrest front portion. Therefore, during a vehicle normal driving without detecting proximity of an object from the rear, it is possible to prevent ratio noise from being generated.

The controlling means stops operating the head detecting circuit based upon a detection signal of the head detecting circuit at a time of detection of the proximity of the head of the occupant towards the headrest front portion.

In this case, the capacitance detecting circuit is stopped when the proximity of the head is detected. Therefore, the capacitance detecting circuit is stopped appropriately in response to or as a stop of movement of the headrest front portion. As described above, in the event of an impact or collision of the vehicle, the capacitance detecting circuit is stopped. Therefore, it is possible to prevent radio noise from being generated after protecting the head of an occupant by the movement of the headrest front portion.

The controlling means stops operating the head detecting circuit when the headrest front portion reaches the second position.

In this case, the capacitance detecting circuit is stopped when the headrest front portion reaches the second position. Therefore, the capacitance detecting circuit is stopped appropriately in response to or as a stop of movement of the headrest front portion. As described above, by stopping the capacitance detecting circuit, in the event of an impact or collision of the vehicle, it is possible to prevent radio noise from being generated after protecting the head of an occupant by the movement of the headrest front portion.

The headrest control apparatus for a vehicle further includes a filter portion having a plurality of lowpass filters, each of which has a different cutoff frequency, and inputted with a detection signal of the head detecting circuit. The lowpass filter to be employed by the controlling means is shifted among the plural lowpass filters of the filter portion from one having a high cutoff frequency to a next one having a low cutoff frequency consecutively over time since start of the operation of the head detecting circuit.

In this case, until the predetermined period of time elapses since an initial operation of the capacitance detecting circuit, a lowpass filter with a high cutoff frequency is employed. Once the predetermined period of time elapses, a lowpass filter with a low cutoff frequency is employed. According to the embodiment of the present invention, the capacitance detecting circuit 25 is operated only when needed. This may generate a delay in an initial rising of the lowpass filter in the event that the capacitance detecting circuit is started up. Meanwhile, a lowpass filter with a high cutoff frequency (small filtering performance) enhances an electric following in the event that the capacitance detecting circuit is started up. When an output is stabilized, a filter, which possesses ability sufficient during a normal operation, is employed so that a necessary performance is ensured.

As described above, it is possible to restrain an occurrence of radio noise which may be generated by a capacitance detecting circuit detecting a head by use of a capacitive sensor.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A headrest control apparatus for a vehicle, comprising:
    a headrest rear portion supported by a seatback;
    a headrest front portion movable relative to the headrest rear portion between a first position, at which the headrest front portion is in contact with the headrest rear portion, and a second position, at which the headrest front portion is frontward distant from the headrest rear portion;
    a motor-operated driving device for moving the headrest front portion relative to the headrest rear portion between the first position and the second position;
    a head detecting sensor provided at the headrest front portion and outputting a predetermined detection signal when a head of an occupant is proximate to the headrest front portion or when the head of the occupant is in contact with the headrest front portion;
    a head detecting circuit detecting one of a proximity of the head towards, and a contact of the head with, the headrest front portion based upon the detection signal of the head detecting sensor;
    a controlling device controlling the driving device to move the headrest front portion towards the second position when a proximity of an object from a rear of the vehicle is detected and to stop a movement of the headrest front portion towards the second position when the head detecting circuit detects the one of a proximity of the head towards, and a contact of the head with, the headrest front portion, the controlling device operating the head detecting circuit only when the headrest front portion moves towards the second position.

2. A headrest control apparatus for a vehicle according to claim 1, wherein the head detecting sensor is a capacitive sensor detecting capacitance, the head detecting circuit is a capacitance detecting circuit detecting the proximity of the head towards the headrest front portion based upon a detection signal of the capacitive sensor.

3. A headrest control apparatus for a vehicle according to claim 2, further comprising:
    object detecting means for detecting the proximity of the object from the rear of the vehicle,
    wherein the controlling means controls, based upon a detection signal of the object detecting means, the driving means to move the headrest front portion towards the second position prior to a vehicle rear impact with the object.

4. A headrest control apparatus for a vehicle according to claim 3, wherein the controlling means operates the head detecting circuit when the controlling means detects an impact possibility of the vehicle with the object based upon the detection signal of the object detecting means.

5. A headrest control apparatus for a vehicle according to claim 3, wherein the controlling means operates the head detecting circuit when the proximity of the object from the rear of the vehicle is detected.

6. A headrest control apparatus for a vehicle according to claim 3, wherein the controlling means operates the head detecting circuit when the driving means starts moving the headrest front portion towards the second position.

7. A headrest control apparatus for a vehicle according to claim 3, wherein the controlling means stops operating the head detecting circuit based upon a detection signal of the head detecting circuit at a time of detection of the proximity of the head of the occupant towards the headrest front portion.

8. A headrest control apparatus for a vehicle according to claim 3, wherein the controlling means stops operating the head detecting circuit when the headrest front portion reaches the second position.

9. A headrest control apparatus for a vehicle according to claim 1, further comprising:
    object detecting means for detecting the proximity of the object from the rear of the vehicle,
    wherein the controlling means controls, based upon a detection signal of the object detecting means, the driving means to move the headrest front portion towards the second position prior to a vehicle rear impact with the object.

10. A headrest control apparatus for a vehicle according to claim 1, wherein the controlling means operates the head detecting circuit when the proximity of the object from the rear of the vehicle is detected.

11. A headrest control apparatus for a vehicle according to claim 1, wherein the controlling means operates the head detecting circuit when the driving means starts moving the headrest front portion towards the second position.

12. A headrest control apparatus for a vehicle according to claim 1, wherein the controlling means stops operating the head detecting circuit based upon a detection signal of the head detecting circuit at a time of detection of the proximity of the head of the occupant towards the headrest front portion.

13. A headrest control apparatus for a vehicle according to claim 1, wherein the controlling means stops operating the head detecting circuit when the headrest front portion reaches the second position.

14. A headrest control apparatus for a vehicle according to claim 1, further comprising:
   a filter portion having a plurality of lowpass filters, each of which has a different cutoff frequency, and inputted with a detection signal of the head detecting circuit,
   wherein the lowpass filter to be employed by the controlling means is shifted among the plural lowpass filters of the filter portion from one having a high cutoff frequency to a next one having a low cutoff frequency since a start of an operation of the head detecting circuit.

15. A method of controlling a headrest control apparatus for a vehicle, comprising:
   a headrest movement step of driving a motor for moving a headrest front portion, which is movable between a first position and a second position, towards the second position when a proximity of an object from a rear of the vehicle is detected, the first position at which the headrest front portion is in contact with a headrest rear portion supported by a seatback of the vehicle, and the second position at which the headrest front portion is distant from the headrest rear portion;
   a headrest stop step of stopping a movement of the headrest front portion towards the second position when a proximity of the head of the occupant towards the headrest front portion is detected; and
   a circuit operation step of operating a head detecting circuit of a head detecting sensor provided at the headrest front portion only when the headrest front portion moves towards the second position.

16. A method of controlling a headrest control apparatus for a vehicle according to claim 15, wherein, in the circuit operation step, the head detecting circuit is operated when an impact possibility of the vehicle is detected.

17. A method of controlling a headrest control apparatus for a vehicle according to claim 15, wherein, in the circuit operation step, the head detecting circuit is operated when the proximity of the object from the rear of the vehicle is detected.

18. A method of controlling a headrest control apparatus for a vehicle according to claim 15, wherein, in the circuit operation step, the head detecting circuit is operated when the headrest front portion starts moving towards the second position.

19. A method of controlling a headrest control apparatus for a vehicle according to claim 15, further comprising:
   a circuit stop step of stopping an operation of the head detecting circuit when the proximity of the head of the occupant towards the headrest front portion is detected.

20. A method of controlling a headrest control apparatus for a vehicle according to claim 15, further comprising:
   a circuit stop step of stopping an operation of the head detecting circuit when the headrest front portion reaches the second position.

* * * * *